(12) United States Patent
Noonan et al.

(10) Patent No.: US 11,272,661 B2
(45) Date of Patent: Mar. 15, 2022

(54) SYSTEM AND METHOD FOR MODIFYING TIRE PRESSURE IN AGRICULTURAL EQUIPMENT

(71) Applicant: Deere & Company, Moline, IL (US)

(72) Inventors: James T. Noonan, Bondurant, IA (US);
Mark A. Cracraft, Johnston, IA (US);
Jerry E. White, Altoona, IA (US);
Kevin J. Goering, Cambridge, IA (US);
Scott R. Bowers, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/587,663

(22) Filed: Sep. 30, 2019

(65) Prior Publication Data
US 2020/0022307 A1    Jan. 23, 2020

Related U.S. Application Data

(62) Division of application No. 15/183,343, filed on Jun. 15, 2016.

(51) Int. Cl.
*G06F 7/70* (2006.01)
*A01D 46/08* (2006.01)
*B60C 23/00* (2006.01)
*B60C 23/04* (2006.01)

(52) U.S. Cl.
CPC .......... *A01D 46/085* (2013.01); *B60C 23/002* (2013.01); *B60C 23/04* (2013.01)

(58) Field of Classification Search
CPC .. A01D 46/085; B60C 23/002; B60C 23/003; B60C 23/04
See application file for complete search history.

(56) References Cited

U.S. PATENT DOCUMENTS

| 6,144,295 | A | 11/2000 | Adams et al. |
|---|---|---|---|
| 7,302,837 | B2 | 12/2007 | Wendte |
| 8,321,093 | B2 | 11/2012 | Pollklas et al. |
| 2013/0073246 | A1* | 3/2013 | Sprague ............... G01L 17/005 702/140 |
| 2014/0060348 | A1 | 3/2014 | Hall et al. |

(Continued)

FOREIGN PATENT DOCUMENTS

| CN | 1067214 A | 12/1992 |
|---|---|---|
| CN | 202080074 U | 12/2011 |

(Continued)

OTHER PUBLICATIONS

"Trelleborg Variable Inflation Pressure," article dated Dec. 23, 2016 (1 page).

(Continued)

*Primary Examiner* — Adam M Alharbi

(57) ABSTRACT

An agricultural vehicle is operable in a first state for transport and in a second state for field work and includes a frame supported by a plurality of tires. A processor is operable to receive a signal generated as a result of the agricultural vehicle transitioning from the first state to the second state or from the second state to the first state. A gas system is operable to modify the tire pressure of the plurality of tires of the agricultural vehicle in response to the signal.

19 Claims, 6 Drawing Sheets

(56) References Cited

U.S. PATENT DOCUMENTS

| | | | |
|---|---|---|---|
| 2015/0059919 A1 | 3/2015 | Stadele et al. | |
| 2015/0091720 A1* | 4/2015 | Graf | B60C 23/0476 340/443 |
| 2016/0030815 A1* | 2/2016 | Sprague | G01L 5/0052 73/12.02 |
| 2017/0015147 A1 | 1/2017 | McClellan | |
| 2017/0113498 A1* | 4/2017 | King | B60C 23/002 |

FOREIGN PATENT DOCUMENTS

| | | |
|---|---|---|
| CN | 103650772 A | 3/2014 |
| CN | 203460630 U | 3/2014 |
| CN | 105383230 A | 3/2016 |
| CN | 205255910 U | 5/2016 |
| DE | 3806322 A1 | 9/1989 |
| EP | 1493599 | 1/2005 |
| EP | 2653324 A2 | 10/2013 |
| WO | WO2010149753 A1 | 12/2010 |

OTHER PUBLICATIONS

Brazilian Office Action issued in counterpart application No. 102017009022.1 dated Aug. 3, 2021 (04 pages).

* cited by examiner

SYSTEM AND METHOD FOR MODIFYING TIRE PRESSURE IN AGRICULTURAL EQUIPMENT

CROSS-REFERENCE TO RELATED APPLICATIONS

The application is a divisional of U.S. patent application Ser. No. 15/183,343 filed Jun. 15, 2016, the entire contents of which are incorporated by reference.

BACKGROUND

The present disclosure relates to agricultural equipment, and more particularly to a system and method for adjusting the tire pressure of certain agricultural equipment.

Agricultural equipment includes powered machinery capable of transporting, cultivating, planting, fertilizing, irrigating, sorting, harvesting, and other operations in the agriculture industry. Some equipment is driven (e.g., towed) by field vehicles such as tractors, for example planters and seeders. Other agricultural equipment includes a motor, transmission, and operator cabin such that the equipment is self-driven or self-propelled (i.e., does not require a tractor for towing), for example cotton harvesters and combine harvesters.

SUMMARY

An agricultural vehicle is operable in a first state for transport and in a second state for field work and includes a frame supported by a plurality of tires. A processor is operable to receive a signal generated as a result of the agricultural vehicle transitioning from the first state to the second state or from the second state to the first state. A gas system is operable to modify the tire pressure of the plurality of tires of the agricultural vehicle in response to the signal.

An agricultural vehicle includes a frame supported by a plurality of tires and a plurality of load sensors. Each load sensor of the plurality of load sensors is operable to measure a weight or loading parameter of a portion of the agricultural vehicle. The agricultural vehicle includes a tire pressure monitoring sensor associated with at least one tire of the plurality of tires. The tire pressure monitoring sensor is configured to measure the internal pressure of the associated at least one tire. A processor is operable to receive a signal from each load sensor of the plurality of load sensors and determine a target tire pressure for the at least one tire. A gas system is operable to increase or decrease the tire pressure of the at least one tire in response to a signal from the processor.

A method for modifying a tire pressure of a plurality of tires of a cotton harvester includes detecting the loading on a front axle and a rear axle of the cotton harvester. Detecting the loading includes identifying the state of a module builder, calculating or measuring the weight of the cotton in an accumulator, and calculating or measuring the weight of the cotton in the module builder. A target tire pressure of the plurality of tires is determined based on the loading. The actual tire pressure of the plurality of tires is calculated or measured. The tire pressure of the plurality of tires is increased or decreased if the actual tire pressure differs from the target tire pressure by more than a predetermined amount.

Other features and parameters of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
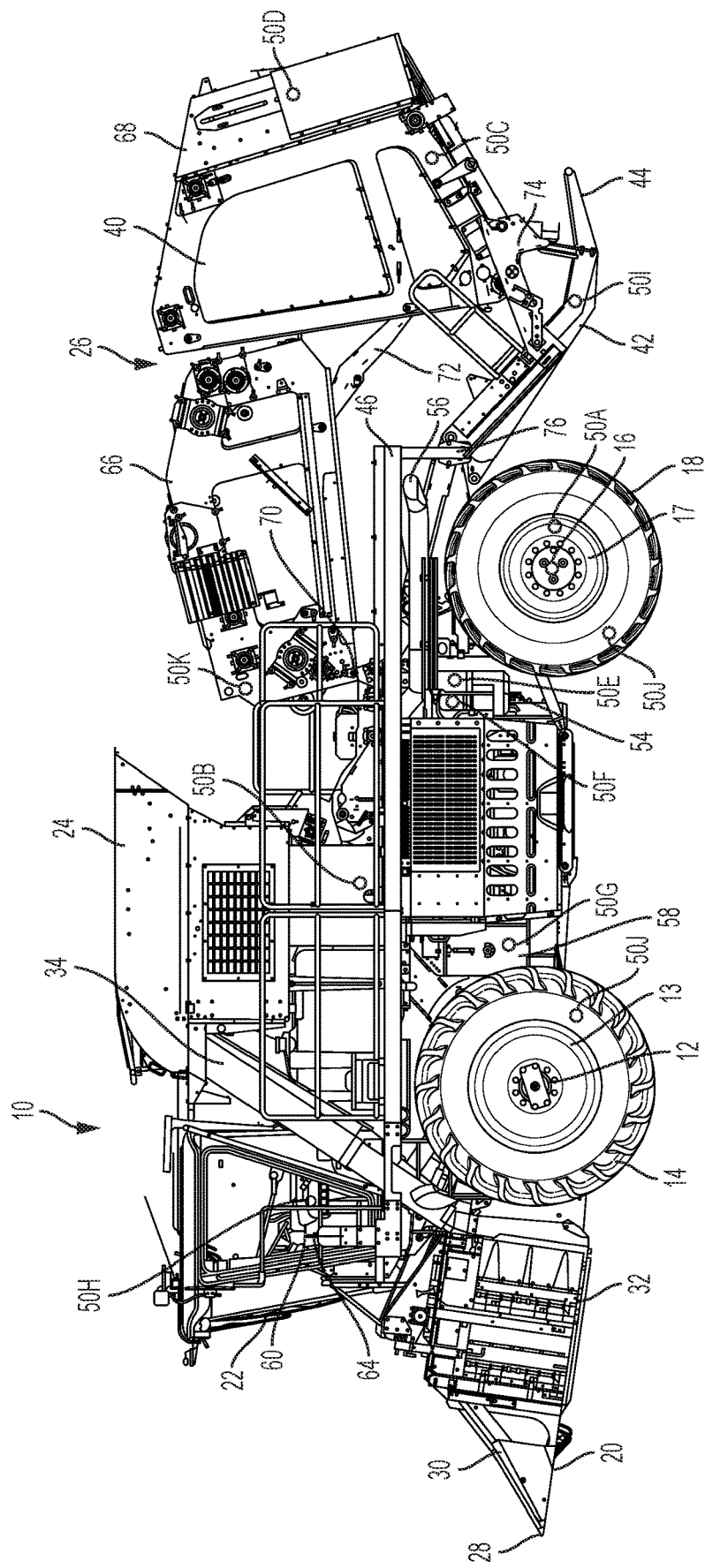
FIG. 1 is a side view of a cotton harvester in a transport state and with schematic representations of various sensors.

As shown in FIG. 1, a cotton harvester 10 includes a pair of axles, a front axle 12 supporting a pair of front wheels 13 and front tires 14, and a rear axle 16, supporting a pair of rear wheels 17 and rear tires 18. The tires 14, 18 (e.g., 520/85R42 tires, IF580/80R34 tires, etc.) support the harvester 10 and provide a rolling surface for the same. The cotton harvester 10 further includes inline row units 20, an operator cabin 22, an accumulator 24, and a module builder 26 supported by a frame 46.

Figure 3:
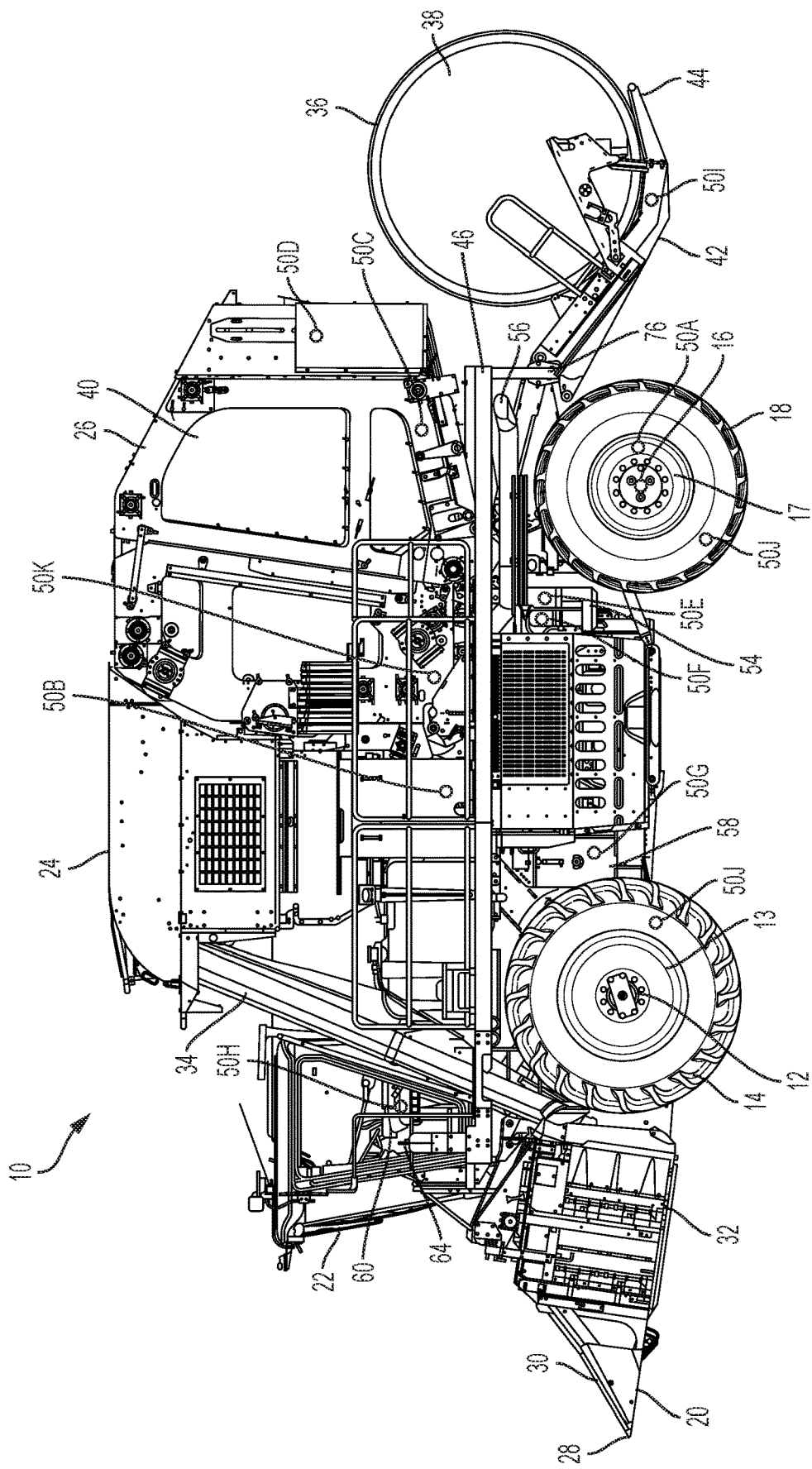
FIG. 3 is a side view of the cotton harvester of FIG. 1 in an outboard module state.

The inline row units 20 are located at a front end 28 of the harvester 10 (as shown to the left of FIG. 1) and include a plurality of picker heads 30 and spindle assemblies 32 spaced apart from one another (e.g., 30-40 inches apart; extending into the page, as shown in FIG. 1) for picking cotton and directing it toward the accumulator 24 through chutes 34 associated with each spindle assembly 32. The cotton gathers within the accumulator 24 until a series of belts (not shown) carry the cotton into the module builder 26. The cotton gathers within a belt and roller system in the module builder 26 which increases in diameter to accommodate the increasing amount of cotton. When a predetermined amount of cotton is located within the module builder 26, a wrap or wrap portion 36 (FIG. 3) is fed around the cotton within the module builder 26 to surround the cotton and produce a module 38 (FIG. 3). Each wrap portion 36 may include an RFID tag to number the modules 38 and keep track of the number of portions 36 remaining on a roll of wrap. As shown, the module builder 26 is a round module builder, and the module 38 is a round module (generally cylindrical with a round cross-section). The harvester 10, as shown, is more specifically a cotton picker, though the harvester 10 may otherwise be embodied as a cotton stripper that utilizes alternative crop gathering assemblies.

Figure 2:
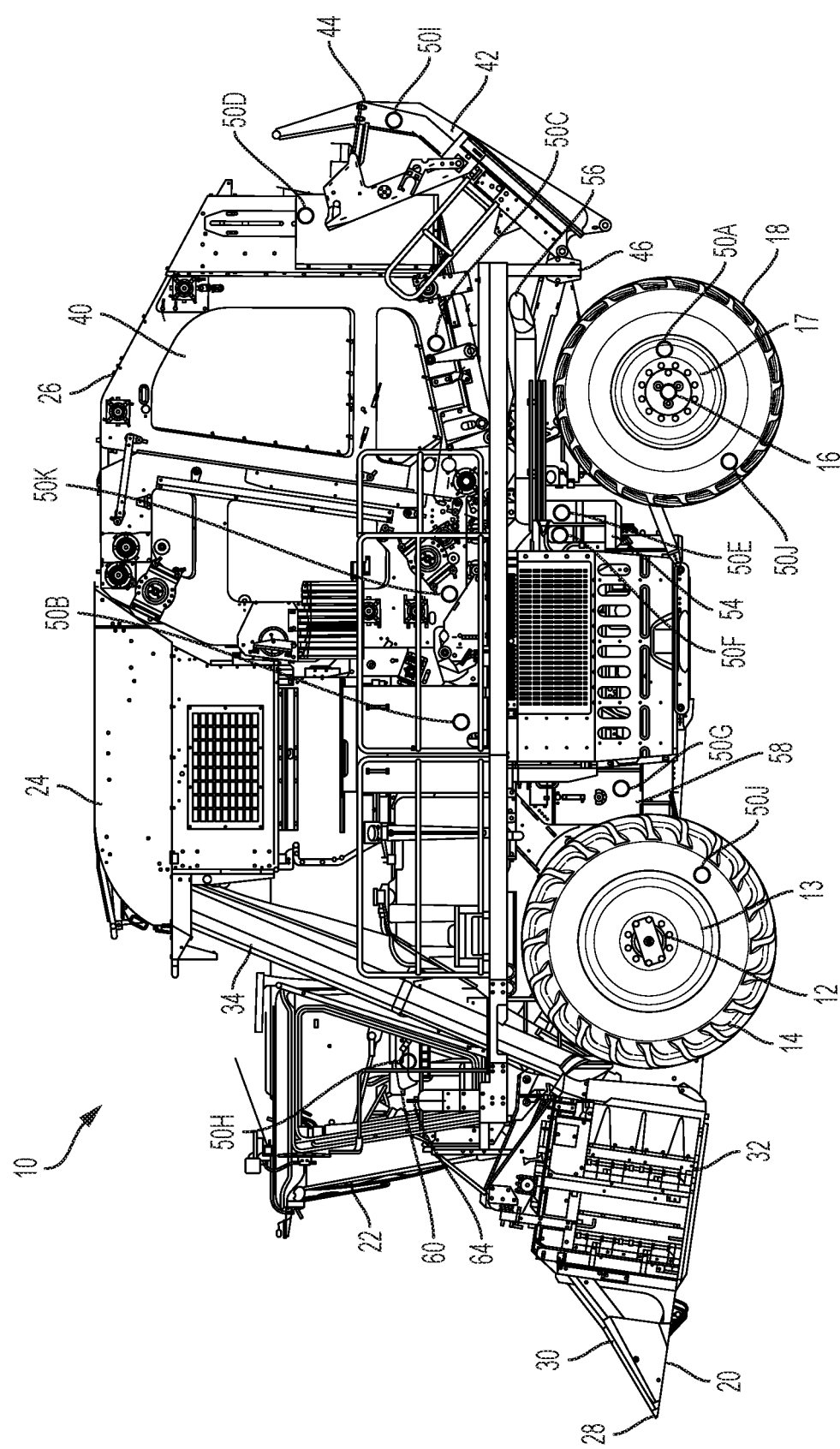
FIG. 2 is a side view of the cotton harvester of FIG. 1 in a module formation state.

Referring to FIGS. 1-3, the module builder 26 includes a processing system 40, which supports the cotton as the module 38 is formed, and a module handling system 42. The module handling system 42, or module handler, is located downstream of the processing system 40 at a rear end 44 of the harvester 10. During operation, the module handling system 42 rotates about the frame 46 of the harvester 10 from a harvest position (FIG. 2) to a full cotton position (FIG. 3) such that a full module 38 exits the processing system 40 and rests upon the module handling system 42. When the harvester reaches the edge of the field, or an alternative location chosen by the operator, the module handling system 42 releases the module 38. The harvester then returns to the harvest position (FIG. 2). It should be noted that the harvester 10 continues to harvest (i.e., the inline row units 20 continue to provide cotton to the accumulator 24) when the harvester 10 is in the full cotton position.

Figure 4:
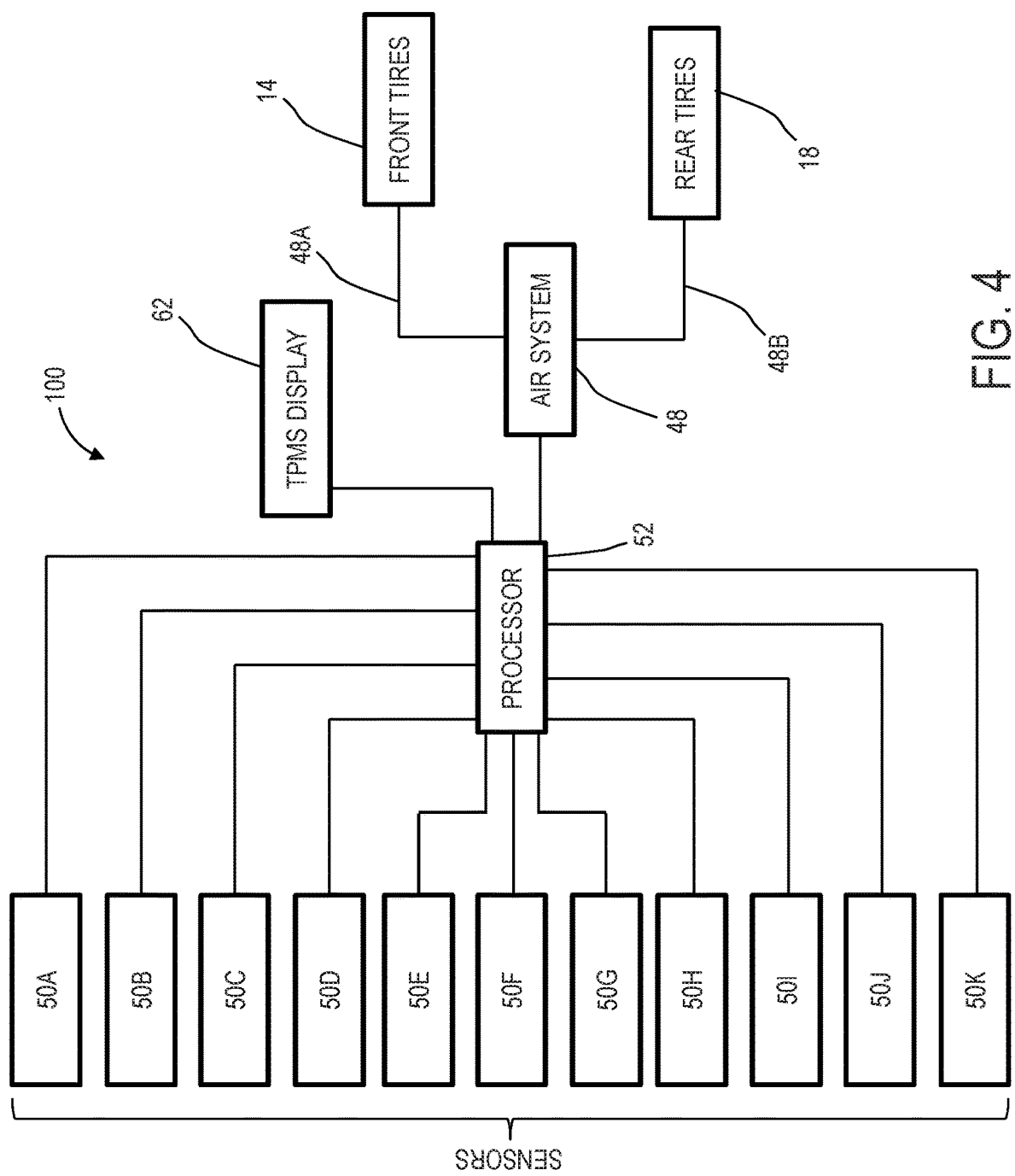
FIG. 4 is a schematic diagram of a control system for the cotton harvester of FIG. 1.

Referring to FIG. 4, the harvester 10 includes an air system or other gas system 48 (e.g., air compressor) operable to provide air or, for example, nitrogen to each of the tires to increase the pressure within the tires. The air system is connected to the front tires 14 via a first air conduit 48A and to the rear tires 18 via a second air conduit. The air system 48 is operable to set a tire pressure of the front tires 14 independent of the rear tires 18 such that the front tires 14 may be set to a first pressure and the rear tires may be set to a second pressure, different from the first pressure. The tires 14, 18 are rated to a maximum inflation pressure and a minimum inflation pressure. Pressure values between the maximum inflation pressure and the minimum inflation pressure define a predefined tire pressure range. Regardless of the state of the harvester 10, the pressure of the tires 14, 18 is maintained within the predefined tire pressure range.

The harvester 10 includes weight and loading parameters that are consistent regardless of the state and operation of the harvester 10. For example, regardless of the state of the harvester 10, the weight of the engine and the transmission (not shown) is constant, and the loading (i.e., weight distribution) of the engine and transmission on the front and rear axles 12, 16 is constant as the engine and transmission are fixed relative to the axles 12, 16. Further, the operator cabin 22, inline row units 20, and accumulator 24 are likewise fixed relative to the axles 12, 16 such that the loading of the operator cabin 22, inline row units 20, and accumulator 24 on the axles 12, 16 is constant.

For example, the accumulator 24 is located behind the spindle assemblies 30 and between the front and rear axles 12, 16, such that the weight of the accumulator 24 is distributed amongst the front and rear tires 14, 18. The center of gravity of the accumulator is located nearer the front axle 12 such that a greater percentage of the weight of the accumulator is carried by the front tires 14. The module builder 26 is located behind the accumulator 24 and is located above the rear axle 16, extending about both sides of the rear axle 16, towards the accumulator 24 and front end 28 of the harvester, and also towards the rear end 32 of the harvester 10 (as shown to the right of FIG. 1). The center of gravity of the module builder 26 is located nearer the rear axle 16 such that a greater percentage of the weight of the module builder 26 is carried by the rear tires 18.

Additionally, the harvester 10 includes weight and loading parameters that are highly variable and dependent upon the state and operation of the harvester. Such weight and loading parameters are measured, calculated, or accounted for by sensors 50A-50K, each of which is operable to measure a weight or loading parameter of the cotton harvester 10 and send a signal to a processor 52.

A wheel speed sensor 50A is operable to send a signal to the processor 52 associated with the rotations of the wheels 13, 17 (e.g., number of rotations, time per rotation, etc.), the signal corresponding to a speed of the harvester 10 or including sufficient information for the processor 52 to calculate the speed of the harvester 10.

A sensor 50B is operable to send a signal to the processor 52 associated with the weight of cotton in the accumulator 24. The sensor 50B may directly measure the weight of cotton in the accumulator 24. Alternatively, to obtain the weight of cotton in the accumulator 24, the sensor 50B may comprise a plurality of sensors that measure the speed of the harvester 10, the inflow rate of cotton through the chutes 34 and into the accumulator 24, and/or the outflow rate of the cotton from the accumulator 24 into the module builder 26. For example, if the outflow of the accumulator 24 is belt driven, the outflow rate is calculated based on the speed of the belt and the size of the opening between the accumulator 24 and the module builder 26. Alternatively, the sensor 50B may be a level sensor located within the accumulator 24 and operable to detect the level of cotton within the accumulator 24. With known variables (e.g., dimensions of the accumulator 24, packing density of cotton within the accumulator), the level of cotton measured by the sensor 50B may be used to calculate the approximate weight of cotton in the accumulator.

The harvester 10 further includes a sensor 50C operable to send a signal to the processor 52 associated with the weight of cotton in the module builder 26. The sensor 50C may directly measure the weight of cotton in the module builder 26. Alternatively, the sensor 50C may be a rockshaft position sensor, calibrated to provide a measurement of the diameter of the cotton in the module builder 26. An estimated density of the cotton based on the diameter can be used to calculate an estimated weight of cotton in the module builder 26. Further still, to obtain the weight of cotton in the module builder 26, the sensor 50C may comprise a plurality of sensors that measure the inflow rate of the module builder 26 (i.e., the outflow rate of the accumulator 24), a time duration since a module 38 was released by the module handling system 42, and/or the state of the harvester 10 (i.e., whether the module handling system 42 is in the full cotton position).

A sensor 50D is operable to send a signal to the processor 52 associated with the weight of the wrap 36 in the module builder 26. The sensor 50D may directly measure the weight of the wrap 36 in the module builder 26. Alternatively, the sensor 50D may scan the RFID tags of the wrap portions 36 to determine how many wrap portions 36 are remaining on the roll. Further still, to obtain the weight of the wrap 36 in the module builder 26, the sensor 50D may comprise a plurality of sensors that record the amount of modules 38 bound with the wrap 36 and the amount of full rolls of wrap 36 remaining within the harvester 10. If the sensors 50D provides a signal to the processor 52 regarding the amount of remaining wrap 36, the processor 52 calculates the weight of the wrap 36 (i.e., with constants such as the weight of a full roll of wrap 36 and the amount of wrap 36 used to bound a module 38).

The harvester 10 further includes a sensor 50E operable to send a signal to the processor 52 associated with the weight of the fuel (e.g., diesel fuel) remaining in a fuel tank 54 (e.g., 350 gallon fuel tank) of the harvester 10. The sensor may directly measure the weight of fuel in the fuel tank 54. Alternatively, to obtain the weight of fuel remaining in the fuel tank 54, the sensor 50E may be a level sensor such as a float sensor, or a capacitive liquid level sensor that otherwise provides an indication to the operator of the current fuel level within the fuel tank 54. If the sensor 50E provides a signal to the processor 52 regarding the level of the fuel in the fuel tank 54, the processor 52 calculates the weight of the fuel (i.e., with constants such as the density of the fuel and the dimensions of the fuel tank 54).

In order to reduce $NO_x$ concentration in diesel exhaust emissions, the exhaust system 56 of the harvester 10 may include a selective catalytic reduction system, which requires the dosing of a diesel exhaust fluid (DEF) from an atomizer (not shown). The harvester 10 further includes a sensor 50F operable to send a signal to the processor 52 associated with the weight of the diesel exhaust fluid in a DEF tank 58. Alternatively, to obtain the weight of the diesel exhaust fluid, the sensor 50F may be a level sensor similar to the level sensor described above with reference to the sensor 50E, or the sensor 50F may record the number of dosing events (i.e., injections into the exhaust system 56) and the duration of the dosing events. If the sensor 50F provides a signal to the processor 52 regarding the number and duration of dosing events, the processor 52 calculates the weight of the diesel exhaust fluid in the fuel tank (i.e., with constants such as the flow rate of the DEF from the atomizer).

The harvester 10 further includes a moistening system including a water reservoir 58 (e.g., 360 gallon reservoir). Water from the water reservoir 58, which may be mixed with a cleaning solution, is utilized throughout operation of the harvester 10 to remove plant gums and resins from the spindle assemblies 32. The harvester includes a sensor 50G operable to send a signal to the processor 52 associated with the weight of water within the water reservoir 58. Alternatively, to obtain the weight of water within the water reservoir 58, the sensor 50G may be a level sensor similar to the level sensor described above with reference to the sensor 50E. If the sensor 50G provides a signal to the processor 52 regarding the level of the water in the water reservoir 58, the processor 52 calculates the weight of the water in the water reservoir 58 (i.e., with constants such as the density of water and the dimensions of the water reservoir 58).

A sensor 50H is operable to send a signal to the processor 52 associated with the weight of the operator in the operator cabin 22. The sensor 50H may be located, for example, in a seat 60 within the operator cabin 22. The sensor 50H may measure the weight of the operator, or may simply determine whether an operator is present.

The harvester 10 further includes a sensor 50I operable to send a signal to the processor 52 associated with the weight of the module 38 on the module handling system 42. The sensor 50I may measure the weight of the module 38, or may only detect the presence of the module 38 on the module handling system 42. Alternatively, the sensor 50I may be unused, instead utilizing the sensor 50K, as described below, to determine when the module handling system 42 is capable of supporting a module 38.

The harvester 10 further includes a plurality of TPMS (tire pressure monitoring system) sensors 50J, one sensor 50J associated with each of the tires 14, 18 of the harvester 10. Each TPMS sensor 50J is operable to send a signal to the processor 52 associated with the current tire pressure of each of the tires 14, 18. The cabin 22 may include a TPMS display 62, which provides the operator with a visual readout of the current tire pressures.

The harvester 10 is operable to transition between three states, a shipping state (not shown), a transport state (FIG. 1), and a harvest state (FIGS. 2-3). The harvest state includes a module formation state (FIG. 2), and an outboard module state (FIG. 3). In the module formation state, the module builder 26 is operable to receive cotton from the accumulator 24 and is positioned directly adjacent the accumulator 24, the processing system 40 of the module builder 26 abutting the accumulator 24. The module handling system 42 is in an upright arrangement such that a module cannot rest upon the module handling system 42. Though not shown, the harvester 10 may also transition between the transport state (FIG. 1) and the shipping state. In the shipping state, the harvester 10 is folded down into its lowest position, such that the overall height of the harvester 10 is reduced.

An operator may actuate an actuation mechanism 64 (e.g., digital switch, analog switch, tethered button, remote service point, etc.) to transition the harvester 10 from the harvest state to the transport state, or from the transport state to the harvest state. The actuation mechanism may be located within the operator cabin 22, on the exterior of the vehicle 10 (e.g., fixed to the exterior of the vehicle 10 or otherwise tethered) or located remotely. In the transport state, the processing system 40 of the module builder 26 splits into a first portion 66 and a second portion 68 connected to the first portion 66. The first portion 66 rotates away from the accumulator 24 about a pivot point 70 fixed to the frame 46 of the harvester 10. The pivot point 70 is fixed to a lower portion (i.e., relative to the ground) of the first portion 66. The second portion 68 is connected to the first portion 66 via an arm 72, allowing the second portion 68 to rotate and translate relative to the first portion 66. The second portion 68 of the processing system 40 is further connected to the module handling system 42 via an arm 74, allowing the second portion 68 to rotate and translate relative to the module handling system 42. The module handling system 42 is connected to the frame 46 at a pivot point 76 such that the module handling system 42 is operable to rotate relative to the frame 46 about the pivot point 76. The pivot point 76 is fixed to a lower portion (i.e., relative to the ground) of the module handling system 42.

An operator may operate the actuation mechanism 64 (or an alternative mechanism) to transition the harvester 10 from the module formation state to the outboard module state, or from the outboard module state to the module formation state. As shown in FIG. 3, when the harvester 10 is in the outboard module state, the module handling system 42 rotates about the pivot point 76 such that the module handling system 42 is operable to support the module 38 in an outboard state (i.e., the module 38 is not enclosed within the module builder 26). Alternatively, the harvester 10 may automatically transition from the module formation state to the outboard module state when the module builder 26 is full and a module 38 is fully formed.

Additionally, an operator may operate the actuation mechanism 64 (or an alternative mechanism) to transition the harvester 10 from the transport state to the shipping state, or from the shipping state to the transport state. In the shipping state, the overall size of the harvester 10 is reduced by removing components such as picking units 30, 32, duals, platform extensions, and the accumulator lid. It may be further beneficial to reduce the tire pressure of the tires 14, 18 in order to reduce the overall height of the harvester 10 in the shipping state. The tire pressure of the tires 14, 18 may then be automatically re-inflated or manually commanded to reinflate when transitioning out of the shipping state.

The harvester 10 further includes a sensor 50K operable to send a signal to the processor 52 associated with the state of the harvester 10, and specifically, the state of the module builder 26. The sensor 50K may measure various loading parameters of the harvester 10, the various loading parameters collectively indicative of the state of the harvester 10. Alternatively, the state of the harvester 10 may transition in response to actuation of the actuation mechanism 64, and the processor 52 receives a signal indicative of the current state of the actuation mechanism 64.

Figure 5:
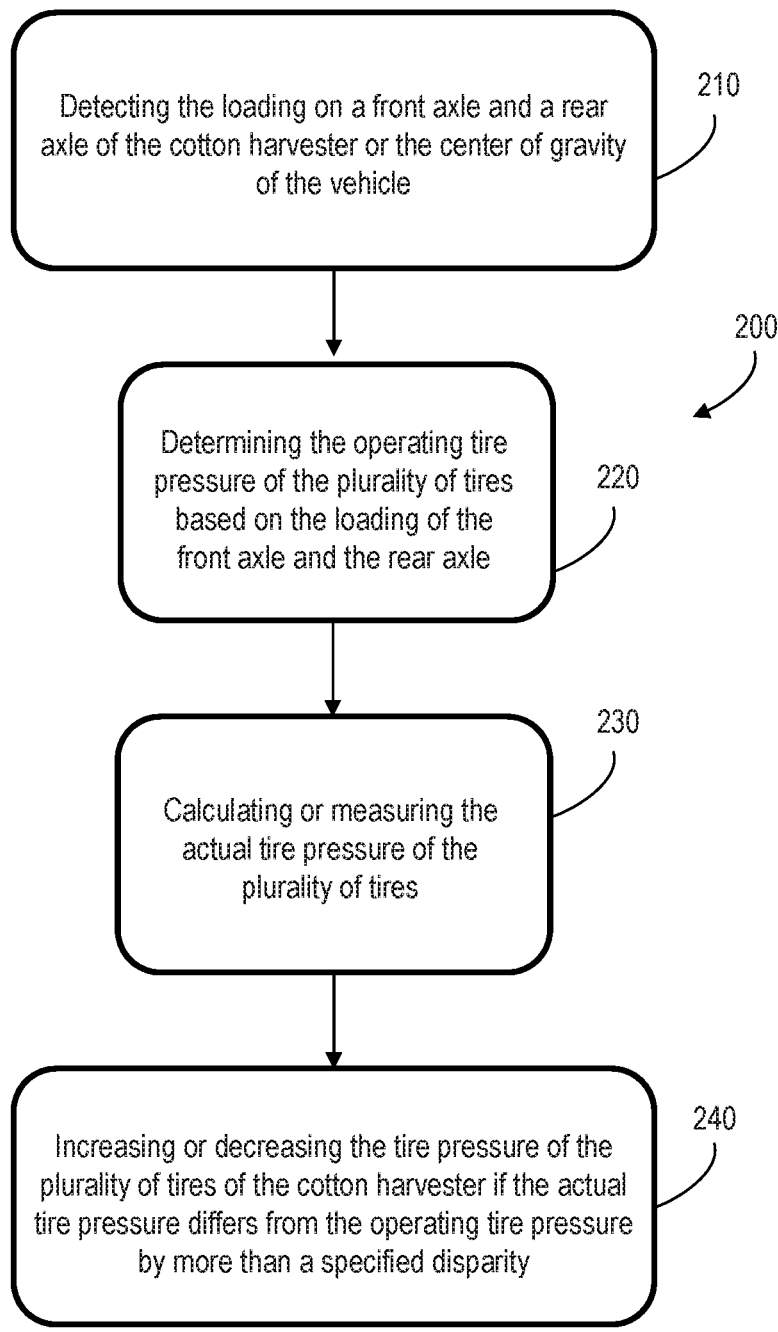
FIG. 5 is a flow diagram outlining a method for modifying tire pressure in an agricultural vehicle.
Figure 6:
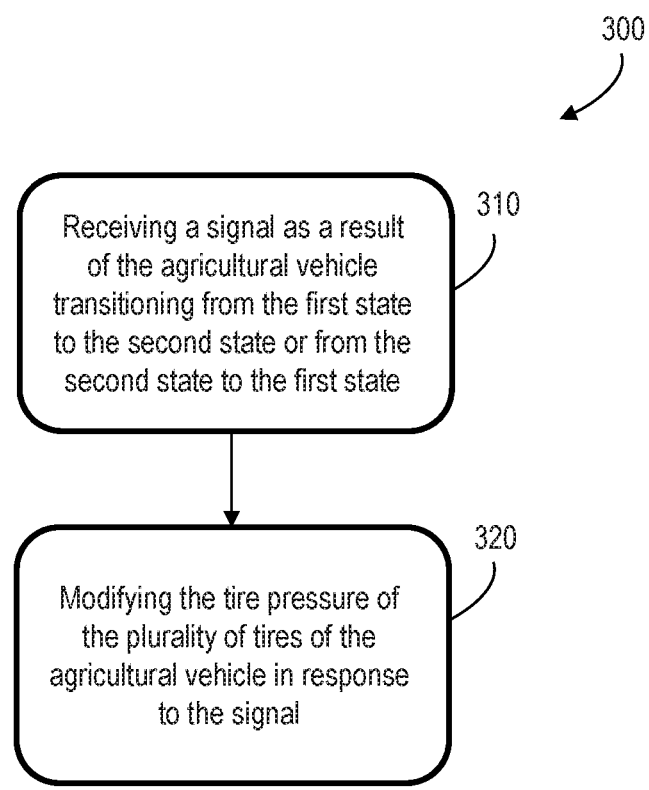
FIG. 6 is a flow diagram outlining a method for modifying a tire pressure of a plurality of tires of an agricultural vehicle.

As further described with respect to the flow diagram 200 of FIG. 5, utilizing the sensors 50A-50I, the processor 52 receives inputs to approximate the loading on the front and rear axles 12, 16 or approximate the center of gravity of the harvester 10 (Step 220). It is to be understood that not all sensors 50A-50I are required, or required at all times, as certain weights may be considered negligible.

When the processor 52 identifies the current state of the harvester 10 (Step 210), the processor 52 compares the current pressure of the tires, provided by the TPMS sensors 50J (step 230), to the predefined tire pressure for that state of the harvester 10. If the predefined tire pressure is below the current tire pressure, the air system 48 provides compressed air or nitrogen (or other gas) to the tires 14, 18 to inflate the tires to the predefined tire pressure (Step 240). The processor 52 additionally provides a readout to a TPMS display 62 to inform the operator of the current tire pressure. If the predefined tire pressure is above the current tire pressure, the air system 48 vents air from the tires until the predefined tire pressure is reached (Step 240). If necessary, the operator may provide an input to override the tire pressure change within the predefined tire pressure range.

For example, if the processor 52 determines that current loading on the front axle 12 is fifty-eight percent of the total load and the current loading on the rear axle 16 is forty-two percent of the total load, the processor 24 determines that the harvester is in the transport state (i.e., due to the overhang position of the module builder 26 in the transport state). In the transport state, the tire pressure of the rear tires is increased relative to the harvest state to reduce rolling resistance on relatively hard surfaces, such as pavement or gravel roads. The tire pressure of the front tires 14 may be likewise increased to reduce rolling resistance and wear at the increased speeds (i.e., relative to the harvest state), or may alternatively be lowered to reduce ride stiffness for an improved ride.

If, for example, the processor 52 determines that current loading on the front axle 12 is sixty-seven percent of the total load and the current loading on the rear axle 16 is thirty-three percent of the total load, the processor 24 determines that the harvester is in the module formation state. In the module formation state, the tire pressures of the front and rear tires are decreased, within the predefined tire pressure range, to reduce compaction of the soil and provide an optimal tire flex. This is additionally possible as vehicle speeds are decreased relative to the transport state. As the harvester 10 harvests cotton, fills the accumulator 24 and module builder 26, produces a module 38, and positions the module 38 on the module handling system 42, the loading on the front and rear axles 12, 16 transitions from sixty-seven and thirty-three percent to, for example, fifty-three and forty-seven percent, respectively. As the loading changes, the processor records the change from the module formation state to the outboard module state and modifies the tire pressure of the front and rear tires 12, 16 to reduce compaction and rolling resistance while remaining within the predefined tire pressure range. Reducing the tire pressure in the harvest state can also improve mobility of the harvester 10 in wet or muddy conditions.

Alternatively, the processor 52 may provide a signal to the air system 48 to adjust the tire pressure dependent upon the sensed loading of the axles 14, 18 without consideration of the state of the harvester 10. The sensors 50A-50J may be used to determine the instantaneous loading of the front and rear axles 14, 18. Each loading scenario (i.e., percentage of weight distributed to front axle 14 as opposed to rear axle 18) correlates or compares with the target operating tire pressure which may be calculated or alternatively in the form of a value stored within the processor. When the loading of the front axle 14 is determined to be a specific percentage, based on the outputs of the sensors 50A-50J, the processor determines the appropriate tire pressure for the front and rear tires 12, 16. If the calculated or stored pressure differs from the current pressure (determined via the TPMS sensors 50J), the processor 52 sends a signal to the air system 48 to modify the tire pressures accordingly.

Further still, the state of the harvester 10 may be determined by the sensor 50K, with further tuning of the tire pressures based on inputs to the processor 52 by the other sensors 50A-50J. The sensor 50K provides a basis for the tire pressure in the tires 12, 16 based on the state defined by the current position of the actuation mechanism 64 (i.e., if the state of the harvester 10 has transitioned from a first state to a second state; Step 310), and as the loading is modified (e.g., cotton is added to the accumulator 24, cotton is added to the module builder 26, fuel is used by the engine, etc.), as measured by sensors 50A-50I, the processor 52 provides a signal to the air system 48 to adjust the tire pressures (Step 320). The processor 52 and air system 48 may work together to modify the tire pressures in real time, updating the pressures at all times, may update when the vehicle is stationary, or may update only when the harvester 10 transitions between states.

Such a system 100 can further maintain the tire pressure at or above the minimum tire inflation pressure of the front and rear tires 12, 16 based on the load and speed of operation, as tire inflation pressure can be lost over a short period of time. For example, tire pressure may drop five to seven psi during one week of operation. Without regular maintenance and tire pressure monitoring, reductions in tire pressure may lead to tire failure from excessive sidewall flexing. Therefore, the system 100, as described may additionally reduce harvester downtime and improve the operation of the harvester 10.

The system 100 may further increase or decrease the pressure within the left tires (i.e., the front and rear tires shown in FIGS. 1-3) relative to the right tires, or may modify the tire pressure of each tire individually. If the weight of the harvester 10 is not evenly distributed from the left side to the right side (e.g., if the weight of the fuel, water, passenger cabin, etc. is offset to one side of the harvester 10) the tire pressures of left or right tires may be modified relative to the other tires to limit compaction in the harvest state and improve comfort or fuel economy in the transport state.

Though described with respect to a cotton harvester 10, the system 100 may be otherwise implemented on an alternative agricultural vehicle such as a combine harvester. A combine harvester may measure many of the weights outlined with respect to the cotton harvester 10 above (e.g., fuel weight, DEF weight, etc.), utilizing the associated sensors. In addition, a system programmed to determine the center of gravity or loading of a combine harvester could determine the weight of a header and the weight of product in a grain tank.

A combine harvester is operable to harvest a variety of different products, many products requiring a different header or head (e.g., a corn head, a flex head, a rigid head, etc.) at the front of the harvester to collect and harvest the product. Each of the heads weighs a different amount and therefore the axle loading is dependent upon which head is attached to the combine harvester. The weight of the head may be measured directly with a load sensor or pressure sensor. Alternatively, the weight may be programmed into a processor. The head is electrically connected to an electrical system (including the processor) via an electrical harness. The processor may receive a signal indicative of the type of head via the electrical harness. Further, the processor can recognize whether a head is attached to the combine harvester.

Similar to the accumulator 24 of the cotton harvester 10, a combine harvester includes a grain tank operable to store the product. As the product fills the grain tank, the weight of product within the grain tank increases, thereby modifying the axle loading of the vehicle. The weight of product within the grain tank may be measured directly (i.e., with load cells). Alternatively, a mass flow sensor may measure the mass flow rate of the product into the grain tank and out of the grain tank. In addition to determining whether an unloading auger is running, the mass flow rate can provide an estimate of the weight of product within the grain tank. Further, a float type sensor can be used to measure the level in the tank (similar to the sensor used in the fuel tank). Further still, one or more discrete level sensors may be used to determine the height of product within the tank. Measurement accuracy can be further improved be determining what type of crop is harvesting to estimate the bulk density of the product. Utilizing the density, measured height, and fixed dimensions of the tank, the weight of product within the tank can be estimated.

The header weight and grain tank weight can be provided to the processor, in addition to other weight measurements and calculations, to determine the center of gravity and axle loading of the combine harvester. In response, the pressure of tires of the combine harvester can be adjusted to account for the variations in loading by actuating an air system.

Various features of the disclosure are set forth in the following claims.

What is claimed is:

1. An agricultural vehicle operable in a first state for transport and in a second state for field work, the agricultural vehicle comprising:
    a frame supported by a plurality of tires;
    a processor operable to receive a signal generated as a result of the agricultural vehicle transitioning from the first state to the second state or from the second state to the first state; and
    a gas system operable to modify the tire pressure of the plurality of tires of the agricultural vehicle in response to the signal,
    wherein the first state is a transport state in which the agricultural vehicle is operable at a first speed, and wherein the second state is a harvest state in which the agricultural vehicle is limited in operation to a second speed less than the first speed.

2. The agricultural vehicle of claim 1, wherein the gas system is operable to release gas from the plurality of tires to reduce the tire pressure of the plurality of tires in response to the agricultural vehicle transitioning from the first state to the second state.

3. The agricultural vehicle of claim 1, wherein the gas system is operable to add gas to the plurality of tires to increase the tire pressure of the plurality of tires in response to the agricultural vehicle transitioning from the second state to the first state.

4. The agricultural vehicle of claim 3, wherein the gas system includes an onboard compressor configured to automatically adjust tire pressure.

5. The agricultural vehicle of claim 1, wherein the signal is a first signal, and further comprising a module builder having a processing system for producing a module and a module handling system, the harvest state comprising a module formation state in which the module is formed in the processing system and an outboard module state in which the module from the processing system is supported in an outboard state on the module handling system, the agricultural vehicle further operable to transition between the module formation state and the outboard module state, wherein the processor is configured to receive a second signal in response to the agricultural vehicle transitioning from the module formation state to the outboard module state, and wherein the tire pressure of the plurality of tires of the agricultural vehicle is modified in response to the second signal.

6. The agricultural vehicle of claim 5, wherein the module handling system is further configured to release the module such that the module is not supported by the module handling system, wherein the processor is configured to receive a third signal in response to the cotton harvester transitioning from the outboard module state to the module formation state, and wherein the tire pressure of the plurality of tires of the agricultural vehicle is modified in response to the third signal.

7. An agricultural vehicle operable in a first state for transport and in a second state for field work, the agricultural vehicle comprising:
    a frame supported by a plurality of tires;
    a module builder having a module handling system and a processing system for producing the module, wherein the second state includes a module formation state in which the module is formed in the processing system and an outboard module state in which the module from the processing system is supported in an outboard state on the module handling system;
    a processor operable to receive a first signal generated as a result of the agricultural vehicle transitioning from the first state to the second state or from the second state to the first state, a second signal in response to the agricultural vehicle transitioning from the module formation state to the outboard module state, and a third signal in response to the agricultural vehicle transitioning from the outboard module state to the module formation state; and
    a gas system operable to modify the tire pressure of the plurality of tires of the agricultural vehicle in response to the first signal, in response to the second signal, and in response to the third signal.

8. The agricultural vehicle of claim 7, wherein the first state is a transport state in which the agricultural vehicle is operable at a first speed, and wherein the second state is a harvest state in which the agricultural vehicle is limited in operation to a second speed less than the first speed.

9. The agricultural vehicle of claim 7, wherein the gas system is operable to release gas from the plurality of tires to reduce the tire pressure of the plurality of tires in response to the first signal, the second signal, or the third signal.

10. The agricultural vehicle of claim 7, wherein the gas system is operable to add gas to the plurality of tires to increase the tire pressure of the plurality of tires in response to the first signal, the second signal, or the third signal.

11. The agricultural vehicle of claim 7, wherein the gas system includes an onboard compressor configured to automatically adjust tire pressure.

12. The agricultural vehicle of claim 7, wherein the plurality of tires includes a first tire and a second tire, wherein the gas system is operable to independently modify a tire pressure of the first tire and a tire pressure of the second tire in response to the first signal, the second signal, or the third signal.

13. The agricultural vehicle of claim 7, wherein the module builder includes a first portion and a second portion, and wherein the first portion is operable to rotate relative to the second portion about a pivot point fixed to the frame when transitioning between the first state and the second state.

14. The agricultural vehicle of claim 7, wherein the module is operable to move from the processing system in the module formation state to the module handling system in the outboard module state such that the weight distribution of the module is distributed differently on the plurality of tires in the module formation state and the outboard module state.

15. An agricultural vehicle operable in a first state for transport and in a second state for field work, the agricultural vehicle comprising:
- a frame supported by a plurality of tires;
- a module builder having a module handling system and a processing system for producing the module, wherein the second state includes a module formation state in which the module is formed in the processing system and an outboard module state in which the module from the processing system is supported in an outboard state on the module handling system;
- a processor operable to receive a signal generated in response to the agricultural vehicle transitioning between the module formation state and the outboard module state; and
- a gas system operable to modify the tire pressure of the plurality of tires of the agricultural vehicle in response to the signal,
- wherein the first state is a transport state in which the agricultural vehicle is operable at a first speed, and wherein the second state is a harvest state in which the agricultural vehicle is limited in operation to a second speed less than the first speed.

16. The agricultural vehicle of claim 15, wherein the gas system is operable to release gas from the plurality of tires to reduce the tire pressure of the plurality of tires in response to the signal.

17. The agricultural vehicle of claim 15, wherein the gas system is operable to add gas to the plurality of tires to increase the tire pressure of the plurality of tires in response to the signal.

18. The agricultural vehicle of claim 15, wherein the gas system includes an onboard compressor configured to automatically adjust tire pressure.

19. The agricultural vehicle of claim 15, wherein the module handling system is configured to release the module such that the module is not supported by the module handling system, and wherein the agricultural vehicle is configured to transition from the outboard module state to the module formation state in response to module handling system releasing the module.

* * * * *